(12) United States Patent
Barber et al.

(10) Patent No.: US 9,141,667 B2
(45) Date of Patent: Sep. 22, 2015

(54) EFFICIENT JOIN WITH ONE OR MORE LARGE DIMENSION TABLES

(71) Applicant: International Business Machines Corporation, Armonk, NY (US)

(72) Inventors: Ronald J. Barber, San Jose, CA (US); Naresh K. Chainani, Portland, OR (US); Guy M. Lohman, San Jose, CA (US); Mir Hamid Pirahesh, San Jose, CA (US); Vijayshankar Raman, Sunnyvale, CA (US); Richard S. Sidle, Mountain View, CA (US); Sandeep Tata, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 204 days.

(21) Appl. No.: 13/756,471

(22) Filed: Jan. 31, 2013

(65) Prior Publication Data
US 2014/0214796 A1  Jul. 31, 2014

(51) Int. Cl.
*G06F 17/30* (2006.01)

(52) U.S. Cl.
CPC .... *G06F 17/30466* (2013.01); *G06F 17/30498* (2013.01)

(58) Field of Classification Search
CPC .............. G06F 17/30592; G06F 17/30463; G06F 17/30498; G06F 17/30312; G06F 17/30466; G06F 17/30; G06F 17/30492; G06F 17/30315; G06F 17/30536; G06F 17/30595; G06F 17/30404; G06F 17/30424; G06F 17/30442; G06F 17/30445; G06F 17/30451; G06F 17/30454; G06F 17/30457; G06F 17/30474; G06F 17/3051; G06F 17/30286; G06F 17/3033; G06F 17/30625; G06F 17/30982; G06F 17/3061; G06F 17/30489; G06F 17/30563; Y10S 707/99935; Y10S 707/99933; Y10S 707/99942; Y10S 707/99934; Y10S 707/99945; Y10S 707/99948; Y10S 707/99931; Y10S 707/99937; Y10S 707/99944; Y10S 707/99954; Y10S 707/957; Y10S 707/958; Y10S 707/99932; Y10S 707/99943
USPC .............. 707/718, 999.002, E17.017, 999.1, 707/999.003, E17.014, 713, 999.004, 707/999.005, 999.001, 999.101, E17.054, 707/616, 754, 769, 999.007, 999.103, 707/999.104, E17.035, E17.131, E17.136, 707/600, 605, 698, 747, 756, 763, 792, 796, 707/797, 798, 801, 803, 807, E17.058, 958, 707/602, 737, 802, 954, 957, 999.107, 714, 707/715, 999.102
See application file for complete search history.

(56) References Cited

U.S. PATENT DOCUMENTS 7,020,661 B1 *  3/2006 Cruanes et al. .................. 1/1
7,730,055 B2     6/2010 Bellamkonda et al.

(Continued)

*Primary Examiner* — Hosain Alam
*Assistant Examiner* — Diedra McQuitery
(74) *Attorney, Agent, or Firm* — Lieberman & Brandsdorfer, LLC

(57) ABSTRACT

Embodiments of the invention relate to processing queries that utilize fact and/or dimension tables. In one aspect, a pre-join filtering phase precedes a star join. The necessary conditions for the pre-join filtering are considered for a given SQL query, including an estimated size of the hash table exceeding a threshold and presence of a local predicate either on the fact table or one or more dimension tables that is not a large dimension table. Once the necessary conditions are satisfied, the execution of the query exploits the pre-join filtering to build a pre-join output filter from columns of a reduced fact table that joins with each large dimension table. Thereafter, all the dimension tables and the fact table are joined in a star join while exploiting each pre-join filter.

23 Claims, 7 Drawing Sheets

(56) References Cited

U.S. PATENT DOCUMENTS

| | | | |
|---|---|---|---|
| 2004/0243589 A1* | 12/2004 | Gu et al. | 707/100 |
| 2008/0189239 A1* | 8/2008 | Bawa et al. | 707/2 |
| 2008/0215556 A1* | 9/2008 | Surna et al. | 707/4 |
| 2009/0281985 A1* | 11/2009 | Aggarwal | 707/2 |
| 2010/0071648 A1 | 3/2010 | Yamaguchi et al. | |
| 2011/0040744 A1* | 2/2011 | Haas et al. | 707/713 |

* cited by examiner

EFFICIENT JOIN WITH ONE OR MORE LARGE DIMENSION TABLES

BACKGROUND

The invention relates to efficiently performing hash join with large dimension tables. More specifically, the invention efficiently performs star join queries that reference large dimension tables.

A fact table is the central table in a star schema of a data warehouse. The fact table stores quantitative information for analysis and works with dimension tables. A fact table holds data to be analyzed, and a dimension table stores data about the ways in which the data in the fact table can be analyzed. Accordingly, dimension tables contain attributes that describe fact records in the fact table.

A star schema is a data warehousing schema that consists of one or more fact tables referencing any number of dimension tables. SQL queries to star schemas are accomplished with inner joins between the fact table and its dimension tables, also known as a star join. The star join is constrained by memory, and as such a star join for a large dimension table is prohibitive.

BRIEF SUMMARY

The invention comprises a method, system, and computer program product for creating a join filter to reduce memory consumption for large dimension tables subject to a query.

In one aspect, table characteristics are gathered to support a query. The gathering includes identifying a first set containing at least one dimension table having a hash table size estimated to exceed a defined threshold, and identifying a second set of remaining tables having at least one local predicate. The query is executed and includes two phases. A pre-join filtering phase builds a join filter for each dimension table of the second set; scans a fact table and reduces the number of rows by applying predicates local to the fact table, and applying join predicates that relate the fact table to a dimension table by probing the join filter; and for each large dimension table, builds a pre-join output filter from columns of the reduced fact table that join with each large dimension table. The second phase joins all the dimension tables and the fact table in a star join while exploiting each pre-join output filter. More specifically, the second phase scans each large dimension table of the first set, applies the created pre-join output filter as a local predicate during the scan, and for each qualifying row of the dimension table creates an entry in a hash table and optionally a join filter; scans each dimension table in the second set, including applying predicates local to each remaining dimension table, and for each qualifying row of each remaining dimension table, creating an entry in an associated hash table and optionally a join filter; and scans the fact table, probing each corresponding join filter (if created) and hash table for each reduced dimension table.

Other features and advantages of this invention will become apparent from the following detailed description of the presently preferred embodiment of the invention, taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments of the invention, and not of all embodiments of the invention unless otherwise explicitly indicated. Implications to the contrary are otherwise not to be made.

DETAILED DESCRIPTION

Figure 1:
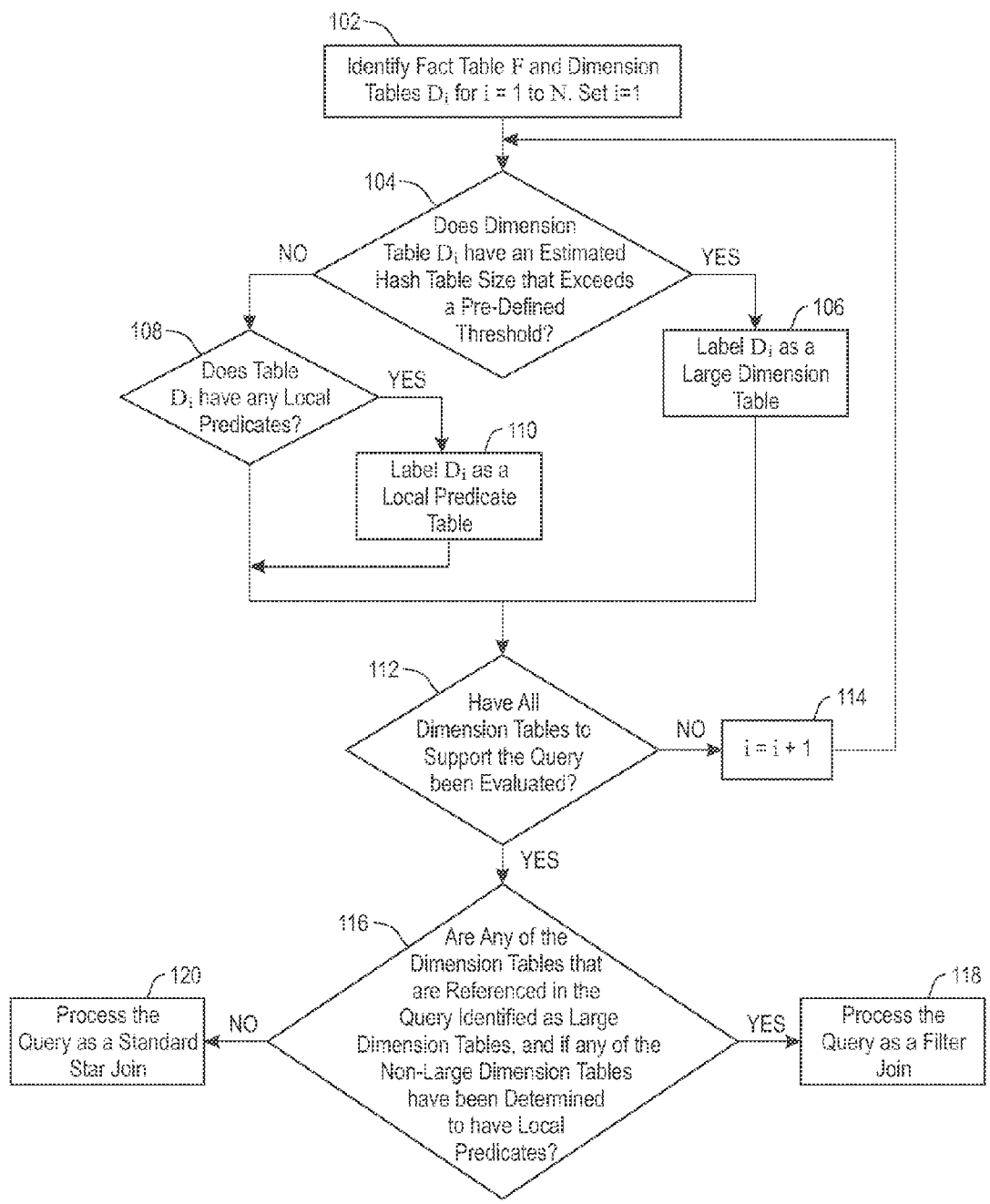
FIG. 1 depicts a flow chart illustrating a process for ascertaining a filter join strategy, and more specifically to change the order of joins in an associated query.

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

The functional units described in this specification have been labeled as managers. A manager may be implemented in programmable hardware devices such as field programmable gate arrays, programmable array logic, programmable logic devices, or the like. The managers may also be implemented in software for processing by various types of processors. An identified manager of executable code may, for instance, comprise one or more physical or logical blocks of computer instructions which may, for instance, be organized as an object, procedure, function, or other construct. Nevertheless, the executables of an identified manager need not be physically located together, but may comprise disparate instructions stored in different locations which, when joined logically together, comprise the managers and achieve the stated purpose of the managers.

Indeed, a manager of executable code could be a single instruction, or many instructions, and may even be distributed over several different code segments, among different applications, and across several memory devices. Similarly, operational data may be identified and illustrated herein within the manager, and may be embodied in any suitable form and organized within any suitable type of data structure. The operational data may be collected as a single data set, or may be distributed over different locations including over different storage devices, and may exist, at least partially, as electronic signals on a system or network.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

Furthermore, the described features, structures, or characteristics may be combined in any suitable manner in one or more embodiments. In the following description, numerous specific details are provided, such as examples of a topology manager, a hook manager, a storage topology manager, a resource utilization manager, an application manager, a director, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

In the following description of the embodiments, reference is made to the accompanying drawings that form a part hereof, and which shows by way of illustration the specific embodiment in which the invention may be practiced. It is to be understood that other embodiments may be utilized because structural changes may be made without departing from the scope of the present invention.

FIG. 1 is a flow chart (100) illustrating a process for ascertaining a filter join strategy, and more specifically for changing the order of joins in an associated query. One of the necessary conditions for ascertaining a filter join strategy is the size of a hash table that is built on a dimension table. If the size of the hash table for any dimension table exceeds available memory or a pre-defined threshold, the corresponding dimension table will be flagged as a large dimension table. As shown, a fact table, F, and dimension tables, $D_i$, are identified to support the query (102). There may be one or more dimension tables, and as such the dimension tables employ a counting variable i, and are assessed from 1 to N, with N representing the maximum quantity of dimension tables to support the query. For each identified hash table, the size of the hash table is estimated, and it is determined if any of the dimension tables $D_i$ have an estimated hash table size that exceeds a pre-defined threshold (104). Each dimension table, $D_i$ that has the estimated hash table that exceeds the threshold is labeled as a large dimension table (106). Accordingly, an estimated hash table size is used to determine whether or not the dimension table is classified as a large or non-large dimension table.

Figure 2:
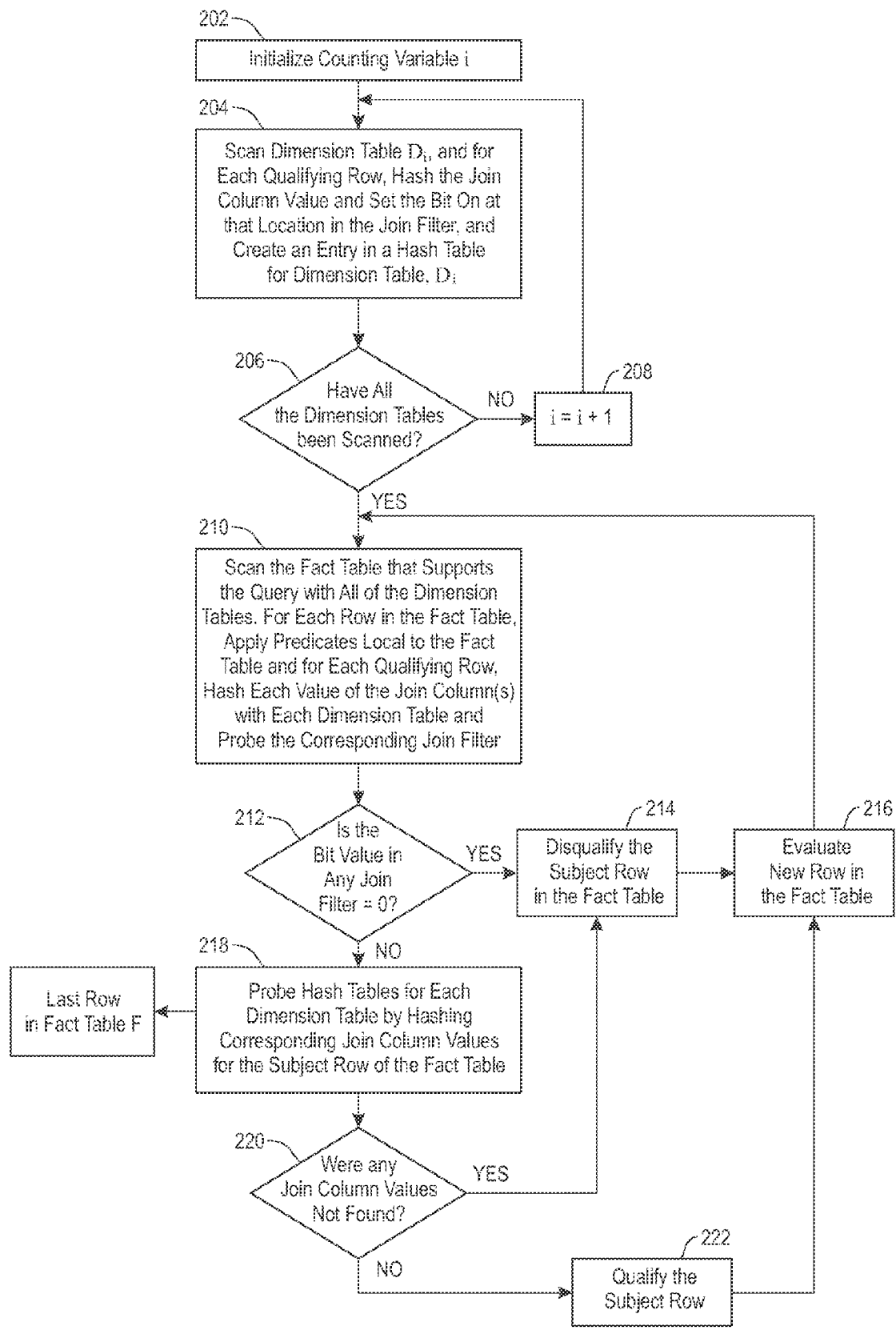
FIG. 2 depicts a flow chart illustrating star join processing using a hash join technique.
Figure 3:
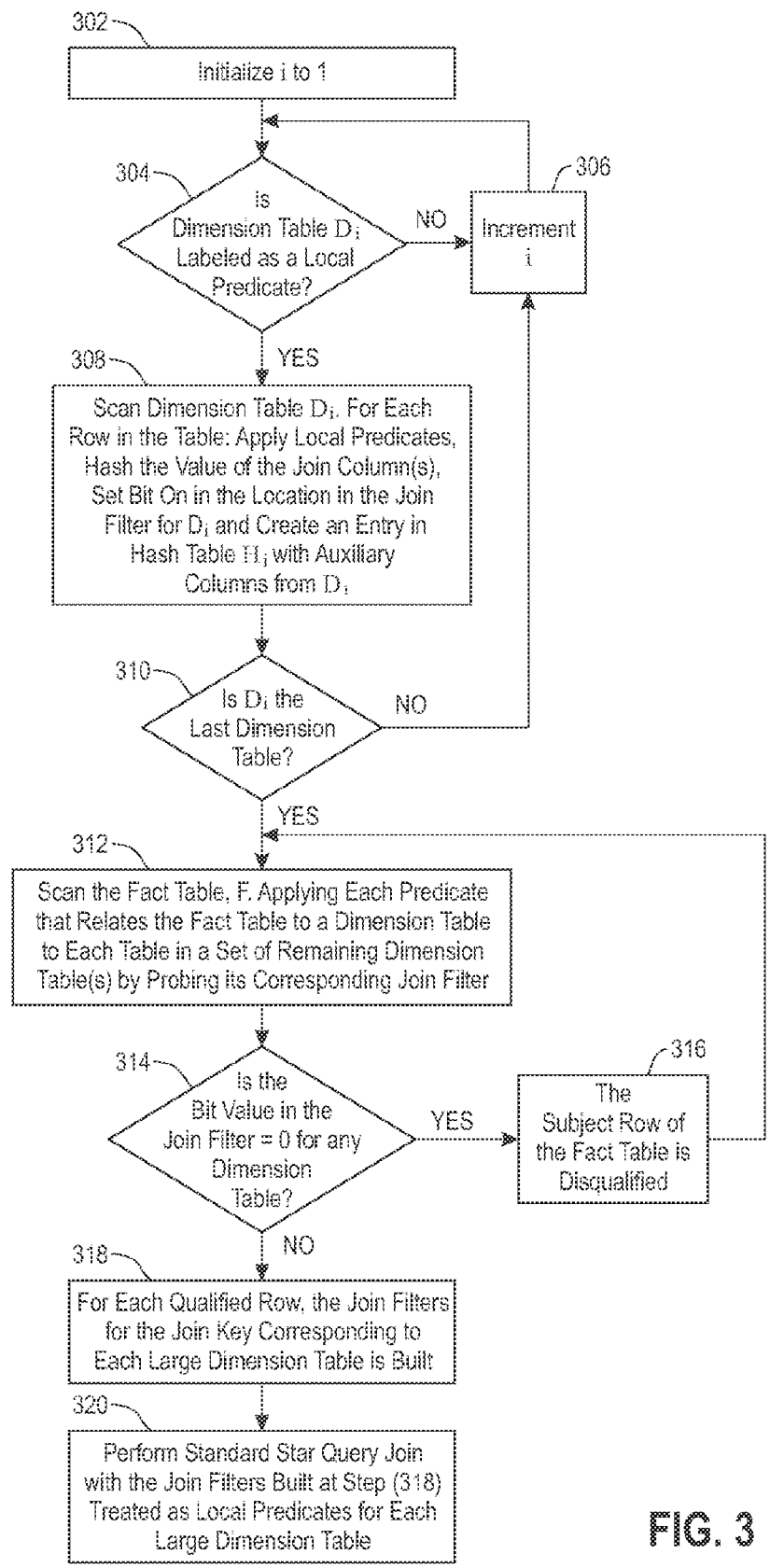
FIG. 3 depicts a flow chart illustrating execution of the pre-join filtering phase.

Conversely, for each dimension table, $D_i$ that is determined not to be a large dimension table, it is determined if these dimension tables have any local predicates (108). Each table that is determined to have a local predicate is labeled as a local predicate table (110). Any table, including the fact table, that is not identified as a large table is referred to herein as a remaining table. Following step (110), a negative response to the determination at step (108), or following step (106), it is determined if all dimension tables that support the query have been evaluated (112). A negative response to the determination at step (112) is followed by an increment of the table counting variable, i, (114) and a return to step (104). However, a positive response to the determination at step (112) is followed by determining if any of the dimension tables that are referenced in the query are identified as large dimension tables, and if any of the remaining tables have been determined to have local predicates (116). The determination at step (116) is a condition precedent to continue the processing of the query. Specifically, a positive response to the determination at step (116) is followed by processing the query as a filter join (118), as illustrated in FIG. 3, and a negative response is followed by processing the query as a standard star join (120), as illustrated in FIG. 2. Accordingly, FIG. 1 is an evaluation of the dimension tables to ascertain the manner in which the query will be processed.

A star schema is a data warehousing schema that consists of one or more fact tables referencing any number of dimension tables. In one embodiment, the dimension tables can themselves have dimension tables. Structured Query Language, SQL, queries of a star schema is accomplished with inner joins between the fact table and its immediate dimension tables in a star join. FIG. 2 is a flow chart (200) illustrating a star join using a hash join technique. The counting variable, i, for the dimension tables in the query, is initialized (202). Following step (202), the dimension table, $D_i$ is scanned. For each qualifying row in the dimension table $D_i$ the join column value is hashed and the bit is set to on at that location in the join filter, and an entry is created in the hash table for the dimension table, $D_i$ (204). In one embodiment, a separate star join filter is built for each dimension table, and the separate star join filter may be probed prior to probing the hash table when joining dimension tables with the fact table. Following step (204), it is determined if all of the dimension tables have been scanned (206). A negative response to the determination at step (206) is followed by incrementing the counting variable, i, (208) and a return to step (204). However, a positive response to the determination completes the scan of the dimension tables. Accordingly, the first part of the star join pertains to the processing of the dimension tables.

As shown and describe in FIG. 2, the star join using a hash technique is employed to process the dimension tables. In one embodiment, one or more of the joins may be accomplished with some other join method other than a hash join, e.g., a sorted-merge join. In that case, hash tables are neither built nor probed, but instead both tables involved in the join, the fact and dimension table, would have to be sorted, then joined by scanning both in order. Since sorts consume memory, reducing large dimension tables via this method is still beneficial.

Following the scan of the dimension tables, the star join process also scans at least one the fact table that supports the query with all of the dimension tables. At step (210), that fact table that supports the query is scanned with all of the dimension tables. For each row in the fact table, predicates local to the fact table are applied, and for each qualifying row, each value of the join column(s) is hashed with each dimension table, and the corresponding join filter is probed. It is then determined if the bit value in the join filter at the location indexed by the hashed value is zero (212). A positive response to the determination at step (212) disqualifies the row in the fact table (214) because that value could not have occurred in the dimension table. The next row in the fact table is evaluated (216), followed by a return to step (210). If at step (212) it is determined that the bit value from the hashing is not zero, the hash tables are probed for each dimension table by hashing corresponding join column values for the subject row of the fact table (218). It is then determined if there were any join column values that were not found (220). A positive response to the determination at step (220) is followed by a return to step (214), and a negative response to the determination at step (220) qualifies the subject row (222), followed by a return to step (216). The scanning of the fact table continues through the rows in the fact table. Accordingly, a star join is appropriate when the dimension tables are small enough to fit in memory.

Once the necessary condition for application of the filter join is ascertained, see FIG. 1, the execution of that query exploits a filter join prior to application of the star join. The filter join exploits a data structure called a join filter, also referred to herein as a pre-join filter, which is a bit map that hashes the value of each join key column to a bit in a fixed-size array initialized to be zero and sets that bit to 1. To minimize the storage overhead of the join filter, it is fixed in size and may be based on the top B bits of the hash value, rather than the complete hash value. The join filter is an approximate filter because hash collisions can occur. Accordingly, there may be false positive outcomes due to the hash collisions, but there are no false negatives.

As shown in FIG. 1, there are two necessary conditions to process the query as a filter join. The conditions include at least one large dimension table and the presence of a local predicate in at least one non-large dimension table or the fact table. Specifically, the query must have at least one local predicate, either on the fact table or one or more of the dimension tables that is not a large dimension table.

FIG. 3 is a flow chart (300) illustrating execution of the filter join. The counting variable, i, for the dimension tables in the query, is initialized (302). Following step (302), it is determined if the dimension table, $D_i$ is labeled as a local predicate (304). A negative response to the determination at step (304) is followed by incrementing the counting variable i (306), followed by a return to step (304). Following a positive response to the determination at step (304), for each dimension table that is not a large dimension table that has one or more local predicates, the dimension table is scanned and a join filter is built on the join key column. Specifically, the dimension table $D_i$ is scanned, and for each row in the dimension table, local predicates are applied, the value of the join column(s) is hashed, the bit in the location in the join filter for $D_i$ is set ON, and an entry in hash table, $H_i$, is created with auxiliary columns from $D_i$ (308). The process of scanning the dimension table at step (308) ignores the large dimension tables and non-local predicate tables. Following step (308), it is determined if the table $D_i$ is the last dimension table subject to scanning (310). A negative response to the determination at step (310) is followed by a return to step (306), but a positive response completes the scanning of the dimension tables that are labeled as local predicate dimension tables.

After the scan of all the dimension tables labeled as a local predicate dimension is complete, the fact table(s) is scanned (312). Specifically, the size of the fact table is reduced by reducing the number of rows in the fact table, including applying any predicates local to the fact table and each predicate that relates the fact table to each dimension table in a set of local predicate dimension table(s) by probing its corresponding join filter. Specifically, the appropriate join column(s) of the fact table are hashed to probe the corresponding join filter built from the join column values of each dimension table, $D_i$ labeled as a local predicate dimension. Following step (312), the join filter is used to reduce the fact table by disqualifying rows through a bit filter. As shown, it is determined if the bit value in the relevant join filter(s) is set to zero for any of the dimension tables (314). If the value is zero, the subject row of the fact table is disqualified (316). The process of disqualifying rows through the bit filter is iterated through all of the rows of the fact table. For each qualified row, i.e. if the value is not zero, the join filters for the join key corresponding to each large dimension table is built (318).

Specifically, at step (318) a pre-join output filter is built from columns of the reduced fact table that join with each large dimension table. Once all of the rows of the fact table have been scanned, a star query join, as shown in FIG. 2, is performed with probes to the pre-join output filters built at step (318) treated as local predicates for each large dimension table (320). As shown in FIG. 3, the filter join is described using a join between a fact table and one or more dimension tables. In one embodiment, the filter join may be applied between two or more fact tables. Similarly, in one embodiment, the filter join may be a join between a fact table and zero or more dimension tables, wherein the filter join only involves scanning the fact table and constructing a pre-join output filter for each join predicate to a large dimension table.

FIG. 2 illustrates the process of star join processing and FIG. 3 illustrates the process of filter join execution. As shown in FIG. 3, execution of the filter join is followed by the star join processing of FIG. 2. Specifically, the filter join execution includes the star join. In one embodiment, the filter join may be referred to as a pre-join filtering phase to reduce each identified large dimension table. The pre-join filter phase includes: building a join filter from each dimension table that is not a large dimension table and has at least one local predicate, scanning a fact table and reducing the number of rows in the fact table by applying predicates local to the fact table and by applying join predicates that relate the fact table to each dimension table that is not a large dimension table and has a local predicate, by probing its corresponding join filter, and for each large dimension table building a pre-join output filter from columns of the reduced fact table that join with each large dimension table. During the star join execution of the filter join, each created pre-join output filter is exploited as a local predicate. In one embodiment, the join filter(s) built at step (318) are employed to eliminate values in the dimension tables that are absent from the fact table before constructing the hash table for the subject dimension, thereby keeping that hash table relatively compact. This embodiment is applicable to the aspect of pre-populating dimension tables with values that are not present in the fact table. Accordingly, the pre-join filter incorporates an approximation of the combined filtering effect of all predicates from the query that was applied in the filtering phase prior to the join with large dimension tables.

FIG. 3 illustrates filter join execution, and is also referred to herein as the pre-join phase. The determination of applicability of the filter join may be ascertained on a static approach or a dynamic approach. The static approach takes place at query compilation time. In this scenario, the query optimization may use available statistics to determine whether a given query should exploit a filter join and generates a plan prior to query execution. The dynamic approach takes place during query execution when the hash table is being built. A filter join can be triggered dynamically whenever memory requirements exceed capacity. Alternatively, the operations to accomplish a filter join can be added to the star join and dynamically disabled at the query execution time if it is determined that sufficient memory is available for the hash table of the large dimension table, or that the predicates are considered not to be sufficiently selective to reduce the size of the hash table. Similarly, in another embodiment, the static and dynamic approaches may be combined into a hybrid approach. In this variant, the query optimizer determines whether one or more large dimension tables exist and are unlikely to be appreciably reduced. The effort of the filter join is bypassed if the actual conditions detected at query execution time are warranted. Accordingly, execution of the filter join can adapt to actual circumstances as the query is executed.

As shown in FIGS. 1-3, one motivation of the filter join is to reduce the space requirements for large dimension tables. In one embodiment, the technique can be applied in parallel settings to decrease the total network traffic incurred. A reference storage distribution for a star schema is to partition the fact table across the nodes of a shared-nothing cluster. In one embodiment, the fact table is the largest table. Small dimension tables are typically replicated on each of the nodes of the cluster. Large dimension tables, however, are too large to be replicated across all nodes, and are therefore also partitioned across the cluster. The partitioning of such large dimension tables may be different from the partitioning key of the fact table. In one embodiment, if there is more than one large dimension table, each large dimension table may require the fact table to be partitioned according to its join column.

Figure 4:
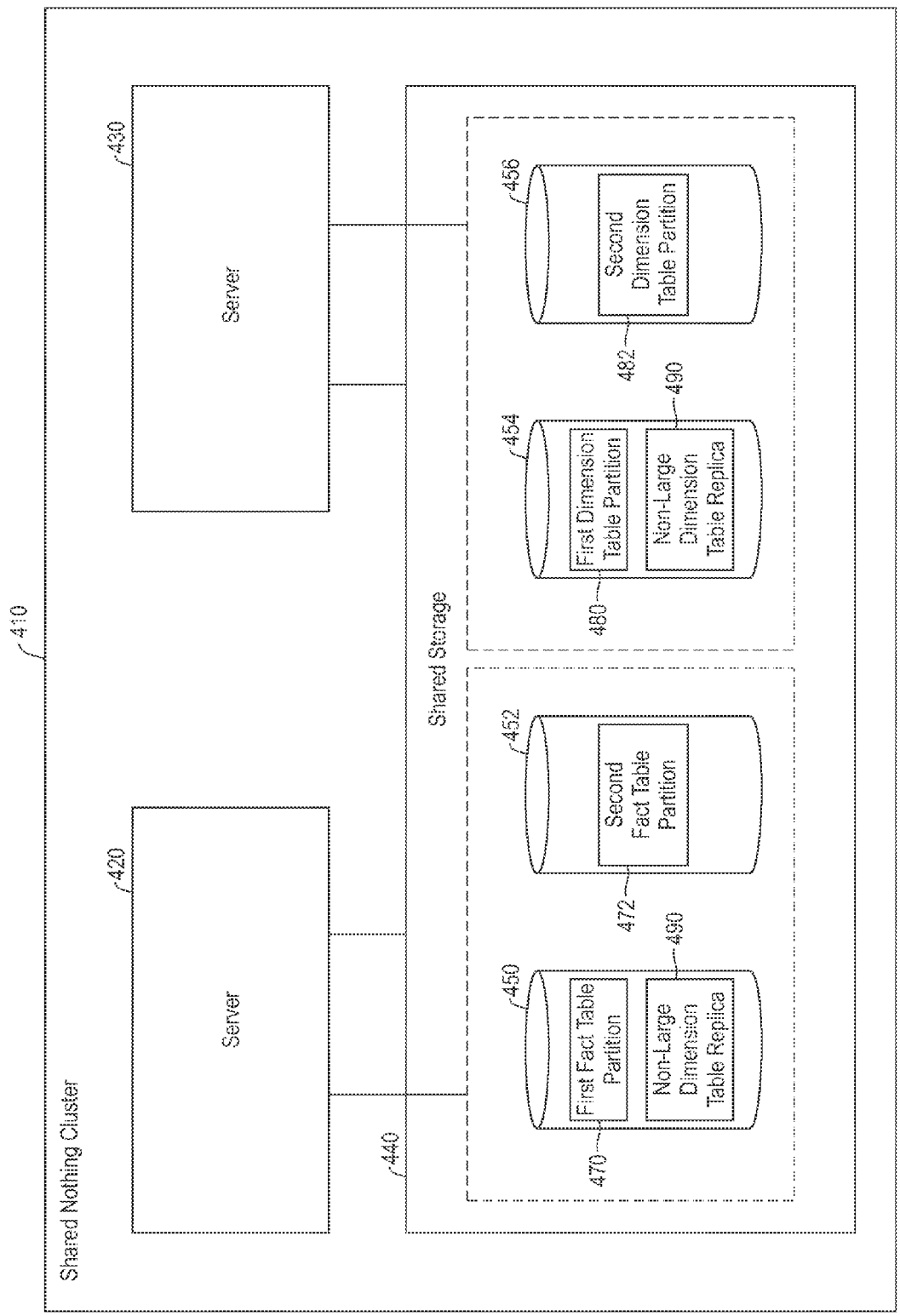
FIG. 4 depicts a schematic diagram of a shared nothing cluster that may be applied to the dimension and fact tables supporting the query processing illustrated in FIGS. 1-3.

FIG. 4 is a schematic diagram (400) of a shared nothing cluster that may be applied to the dimension and facts tables supporting the query processing illustrated in FIGS. 1-3. The shared nothing cluster (410) is shown with two server nodes (420) and (430). Each of the server nodes are in communication with shared storage (440), having storage disks (450), (452), (454), and (456). Although only two server nodes and four storage disks are shown, the invention should not be limited to the quantity shown herein. One server can own a particular shared disk at a time. This prevents other nodes from writing to the disk while the owning node manipulates the data. The other server nodes in the cluster can own their own storage disk, but two server nodes cannot own the same storage disk. As further shown herein, server node (420) owns storage disks (450) and (452), and server node (430) owns storage disks (454) and (456). A fact table (470) to support the query is stored in the cluster (400). To support the query and query processing, the fact table and at least one large dimension table are partitioned across the nodes of the cluster. As shown, the fact table has a first partition (470) stored in storage disks (450) and a second partition (472) in storage disk (452). The first partition (470) and the second partition (472) are partitions of the same fact table. Similarly, the large dimension table is shown herein as having a first partition (480) stored in storage disk (454) and a second partition (482) stored in storage disk (456). However, in one embodiment the partitions may be stored on the same storage disk. The first partition (480) and the second partition (482) are partitions of the same dimension table. In one embodiment, all remaining dimension tables, e.g. non-large dimension tables, are replicated on each node in the cluster. For example, non-large dimension table (490) is replicated on storage disk (450) and storage disk (454), each owned by separate server nodes (420) and (430), respectively. The partitioning reduces space requirements for the tables and also enables processing each partition with a distinct processor, thereby achieving data parallelism, i.e. having each of N processors (or processors) process approximately 1/Nth of the large fact table concurrently.

Figure 5:
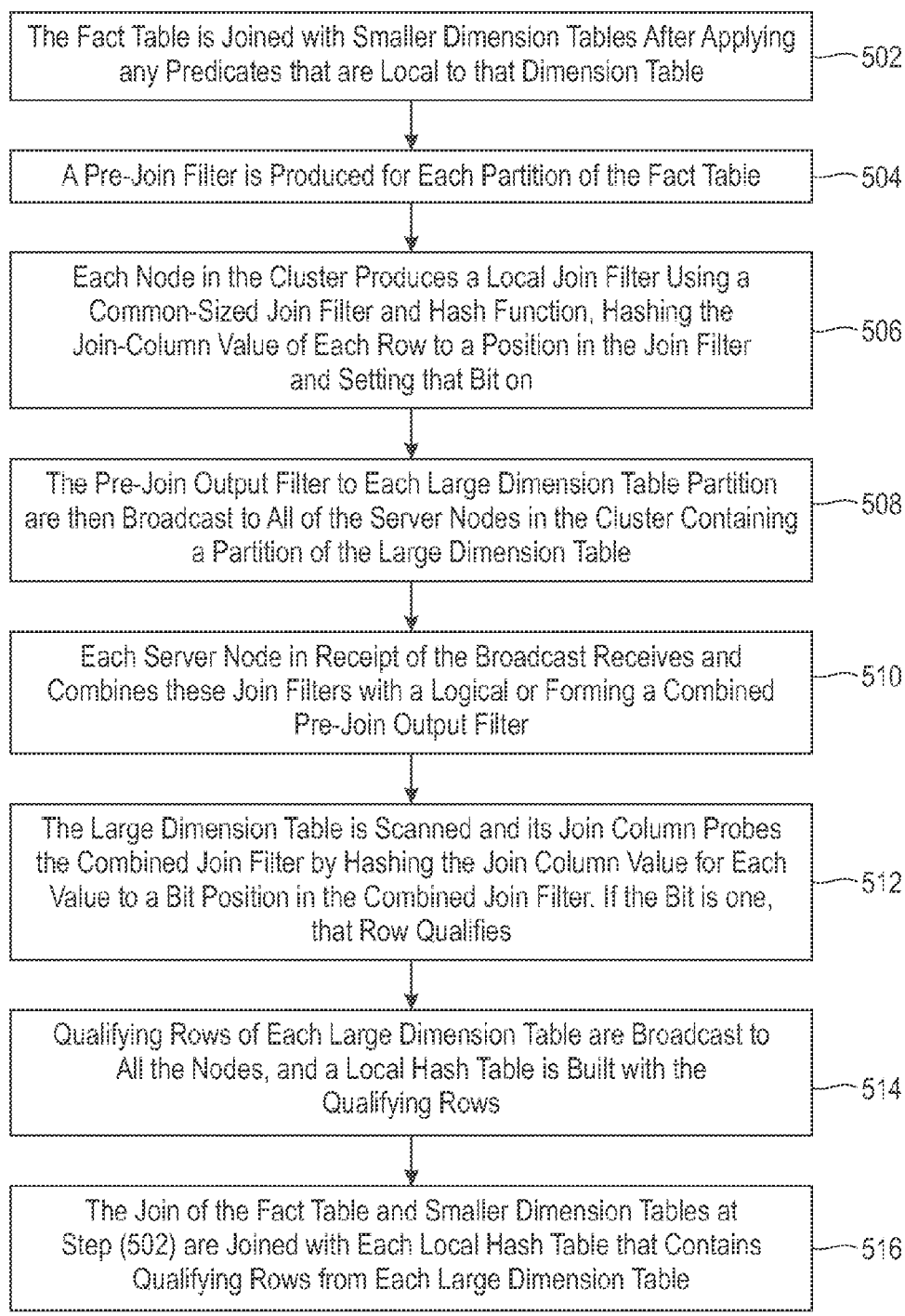
FIG. 5 depicts a flow chart illustrating a technique for partitioning one or more dimension tables across the nodes of the cluster.

FIG. 5 is a flow chart (500) illustrating a technique for partitioning one or more large dimension tables across the nodes of the cluster. Initially the fact table is joined with smaller dimension tables after applying any predicates that are local to that dimension table (502). Qualifying rows in the fact table are then used to produce a set of join filters using the foreign key for each large dimension table (504). At step (504), a pre-join filter is produced for each partition of the fact table. Each node in the cluster produces a local join filter using a common-sized join filter and hash function, hashing the join-column value of each row to a position in the join filter and setting that bit on (506). These join filters, e.g. the pre-join output filter to each large dimension table's partition, are then broadcast to all of the server nodes in the cluster containing a partition of the large dimension table (508). Each server node in receipt of the broadcast receives and combines these join filters with a logical OR operation, forming a combined pre-join output filter (510), i.e. the bits in the same position of each join filter are joined with a logical OR. Following step (510), the large dimension table is scanned and its join column probes the combined pre-join output filter by hashing the join column value for each value to a bit position in the combined pre-join output filter (512). The qualifying rows of each large dimension table are broadcast to all the nodes, and a local hash table is built with the qualifying rows (514). The join of the fact table and smaller dimension tables at step (502) are joined with each local hash table that contains qualifying rows from each large dimension table (516). Accordingly, the use of the pre-join output filters, which are fixed in size and compact compared to the tables, to reduce the size of each partition of the large dimension table before it has to be broadcast to all other nodes to complete the star join reduces network traffic.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 6:
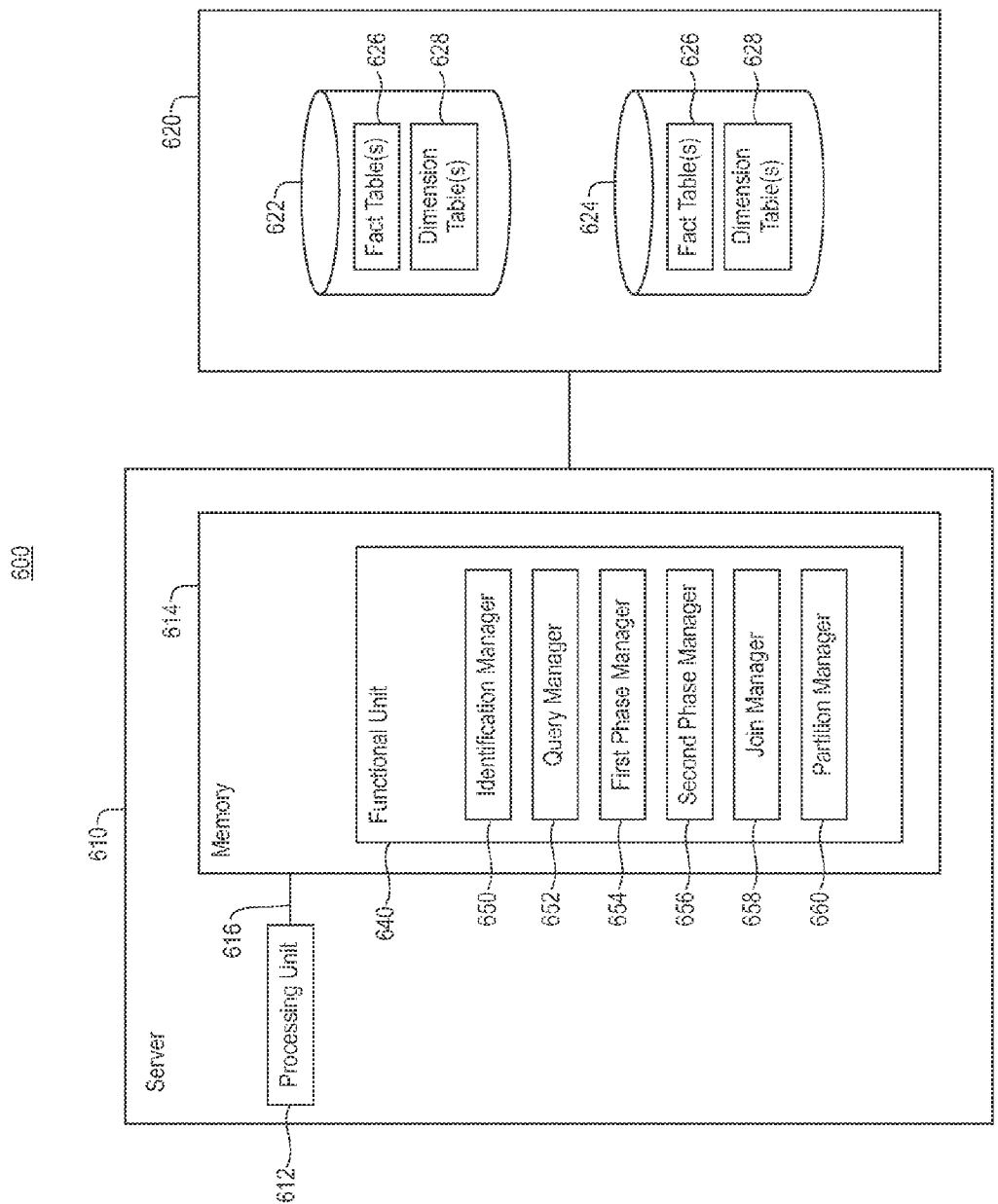
FIG. 6 depicts a block diagram illustrating a system having tools to support the efficient hash joins with one or more large dimension tables

As shown in FIGS. 1-5, a method is provided to support efficient hash joins with one or more large dimension tables. Referring now to FIG. 6 is a block diagram (600) illustrating a system having tools to support the efficient hash joins with one or more large dimension tables. A database system runs on one or more servers. For purposes of description, the system is shown herein with one server (610), although in another embodiment may be shown with two more servers. The server (610) includes a processing unit (612) in communication with memory (614) across a bus (616). A data storage system (620) is in communication with the server (610) across a bus or a network. The data storage system (620) is shown with two storage devices (622) and (624), each which may be employed to store database tables, including fact tables (626) and dimension tables (628).

A functional unit (640) is provided local to the server (610) to support processing of queries submitted to the database, and specifically to the fact table (626) and the dimension tables (628). The functional unit (640) is in communication with the processing unit (612). The functional unit (640) is provided with tools for supporting query processing. The tools include: an identification manager (650), a query manager (652), a first phase manager (654), a second phase manager (656), a join manager (658), and a partition manager (660).

The identification manager (650) functions to identify one or more dimension tables with a hash size that is estimated to exceed a defined threshold, and to also identify all remaining tables that have at least one predicate. The query manager (652), which is in communication with the identification manager (650), functions to execute a query. Specifically, the query manager (652) includes two supporting managers to address different phases of the query, including the first phase manager (654) and the second phase manager (656). The first phase manager (654) functions to reduce the fact table and to build the pre-join filter from the fact table. Output from the first phase manager (654) includes a pre-join output filter from columns of a reduced fact table that is later joined with each large dimension table. In one embodiment, the first phase manager (654) dynamically verifies initiation of the filter join during the build of one of the hash tables if the memory requirements exceed system capacity. Similarly, in one embodiment, the first phase manager (654) eliminates tables in the second set as they are scanned if the local predicate is dynamically verified to be insufficiently selective. Accordingly, the first phase manager (654) functions to efficiently create the pre-join output filter.

The second phase manager (656) functions to join all the dimension tables and the fact table in a star join while exploiting each built pre-join output filter. The join manager (658), which is in communication with the query manager (652) functions to join the fact table with all dimension tables. This includes a scan of the fact table and a probe of each corresponding (optional) join filter and, if not eliminated by the join filter, a probe of the corresponding hash table for each reduced dimension table. In one embodiment, the join manager (658) builds a separate star join filter for each dimension table and probes the separate join filter prior to a probe of the hash table when joining the dimension tables with the fact table.

The partition manager (660) is provided in communication with the query manager (652), and supports partitioning of fact tables and large dimension tables within a computer cluster. Specifically, these tables may be partitioned across two or more server nodes in a shared-nothing cluster. In addition, the partition manager (660) may replicate all the remaining dimension tables on each node in the cluster. To support query processing responsive to the table partitioning and replication, the first phase manager (654) creates a pre-join output filter for each partition of the fact table and broadcasts the filter to each large dimension table partition. For each recipient node that contains the partitions of the large dimension table, a logical OR operation is applied to combine each pre-join output filter.

As identified above, the identification manager (650), query manager (652), first phase manager (654), second phase manager (656), join manager (658), and partition manager (660), hereinafter referred to as tools, function as elements to support efficient hash joins with large dimension tables. The tools (650)-(660) are shown residing in memory (614) local to the server (610) and in communication with the data storage system (620). However, the tools (650)-(660) may reside as hardware tools external to memory (614), or they may be implemented as a combination of hardware and software. Similarly, in one embodiment, the tools (650)-(660)

may be combined into a single functional item that incorporates the functionality of the separate items. In one embodiment, the tools they may be collectively or individually distributed across a network or multiple machines and function as a unit. Accordingly, the tools may be implemented as software tools, hardware tools, or a combination of software and hardware tools.

Figure 7:
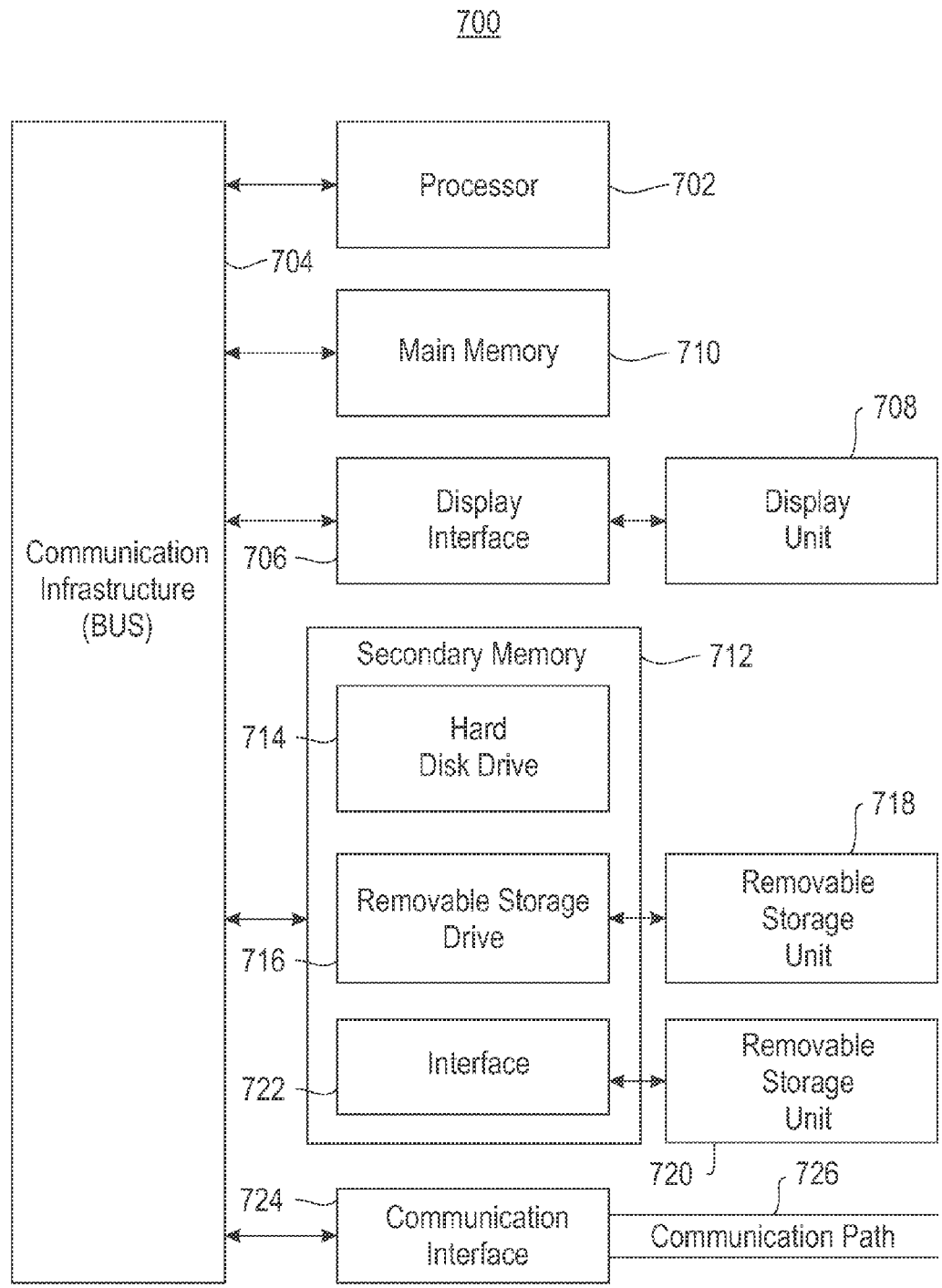
FIG. 7 depicts a block diagram showing a system for implementing an embodiment of the present invention.

Referring now to the block diagram of FIG. 7, additional details are now described with respect to implementing an embodiment of the present invention. The computer system includes one or more processors, such as a processor (702). The processor (702) is connected to a communication infrastructure (704) (e.g., a communications bus, cross-over bar, or network).

The computer system can include a display interface (706) that forwards graphics, text, and other data from the communication infrastructure (704) (or from a frame buffer not shown) for display on a display unit (708). The computer system also includes a main memory (710), preferably random access memory (RAM), and may also include a secondary memory (712). The secondary memory (712) may include, for example, a hard disk drive (714) and/or a removable storage drive (716), representing, for example, a floppy disk drive, a magnetic tape drive, or an optical disk drive. Similarly, in one embodiment the secondary memory (712) may include solid state disks (SSDs), made of flash memory. The removable storage drive (716) reads from and/or writes to a removable storage unit (718) in a manner well known to those having ordinary skill in the art. Removable storage unit (718) represents, for example, a floppy disk, a compact disc, a magnetic tape, or an optical disk, etc., which is read by and written to by removable storage drive (716). As will be appreciated, the removable storage unit (718) includes a computer readable medium having stored therein computer software and/or data.

In alternative embodiments, the secondary memory (712) may include other similar means for allowing computer programs or other instructions to be loaded into the computer system. Such means may include, for example, a removable storage unit (720) and an interface (722). Examples of such means may include a program package and package interface (such as that found in video game devices), a removable memory chip (such as an EPROM, or PROM) and associated socket, and other removable storage units (720) and interfaces (722) which allow software and data to be transferred from the removable storage unit (720) to the computer system.

The computer system may also include a communications interface (724). Communications interface (724) allows software and data to be transferred between the computer system and external devices. Examples of communications interface (724) may include a modem, a network interface (such as an Ethernet card), a communications port, or a PCMCIA slot and card, etc. Software and data transferred via communications interface (724) is in the form of signals which may be, for example, electronic, electromagnetic, optical, or other signals capable of being received by communications interface (724). These signals are provided to communications interface (724) via a communications path (i.e., channel) (726). This communications path (726) carries signals and may be implemented using wire or cable, fiber optics, a phone line, a cellular phone link, a radio frequency (RF) link, and/or other communication channels.

In this document, the terms "computer program medium," "computer usable medium," and "computer readable medium" are used to generally refer to media such as main memory (710) and secondary memory (712), removable storage drive (716), and a hard disk installed in hard disk drive (714).

Computer programs (also called computer control logic) are stored in main memory (710) and/or secondary memory (712). Computer programs may also be received via a communication interface (724). Such computer programs, when run, enable the computer system to perform the features of the present invention as discussed herein. In particular, the computer programs, when run, enable the processor (702) to perform the features of the computer system. Accordingly, such computer programs represent controllers of the computer system.

The flowcharts and block diagrams in the Figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. Accordingly, the enhanced cloud computing model supports flexibility with respect to transaction processing, including, but not limited to, optimizing the storage system and processing transactions responsive to the optimized storage system.

Alternative Embodiment(s)

It will be appreciated that, although specific embodiments of the invention have been described herein for purposes of illustration, various modifications may be made without departing from the spirit and scope of the invention. Accordingly, the scope of protection of this invention is limited only by the following claims and their equivalents.

We claim:

1. A method for efficient hash joins with a large dimension table, comprising:
gathering table characteristics to support a query, the gathering including identifying a first set of at least one dimension table having a hash table size estimated to exceed a defined threshold, and identifying a second set of remaining tables having at least one local predicate;
executing a query responsive to the gathered table characteristics, the query execution including:
reducing each identified large dimension table in the first set, including:
building a join filter from each dimension table of the second set;
scanning a fact table and reducing the fact table by applying predicates local to the fact table, and applying each join predicate to each table in the second set by probing its corresponding join filter; and
for each large dimension table, creating a pre-join output filter from columns of the reduced fact table that join with each large dimension table;
joining all the dimension tables and the fact table in a star join while exploiting each pre-join output filter, including:
scanning each large dimension table of the first set, applying the created pre-join output filter as a local predicate during the scan, and for each qualifying row of the dimension table, creating an entry in a hash table;
scanning each dimension table in the second set, including applying predicates local to each remaining dimension table, and for each qualifying row of each remaining dimension table, creating an entry in an associated hash table; and
joining the fact table with all dimension tables, including scanning the fact table and probing each corresponding hash table for each reduced dimension table.

2. The method of claim 1, further comprising building a separate star join filter for each dimension table and probing the star join filter for each dimension when scanning the fact table, before probing the hash table for that dimension.

3. The method of claim 1, further comprising dynamically verifying initiating the filter join during the building of one of the hash tables responsive to memory requirements exceeding system capacity.

4. The method of claim 1, further comprising eliminating tables in the second set as they are scanned if the local predicate is dynamically verified to be insufficiently selective.

5. The method of claim 1, wherein the pre-join output filter eliminates values in the dimension table that are absent from the fact table.

6. The method of claim 1, further comprising during reducing each identified large dimension table in the first set while scanning each dimension table in the second set, for each qualifying row of each dimension table in the second set creating an entry in an associated hash table, and eliminating scanning of the dimension table in the joining of all the dimension tables and the fact table in a star join.

7. The method of claim 6, further comprising prior to the star join, creating a pre-join output filter for each partition of the fact table and broadcasting the pre-join output filter to each large dimension table partition, and each recipient node containing the partitions of the large dimension table applying a logical OR combining each pre-join output filter.

8. The method of claim 1, further comprising partitioning the fact table and each large dimension table across two or more nodes of a shared-nothing cluster, and all remaining dimension tables are replicated on each node in the cluster.

9. A computer program product for efficient hash joins in a query with a large dimension table, the computer program product comprising a computer-readable storage device having program code embodied therewith, the program code being executable by a processor to:
gather table characteristics to support the query, the gathering including identification of a first set of at least one dimension table having a hash table size estimated to exceed a defined threshold, and identification of a second set of remaining tables having at least one local predicate;
execute a query responsive to the gathered table characteristics, the query execution including:
reduce each identified large dimension table in the first set, including:
building a join filter from each dimension table of the second set;
scanning a fact table and reducing the fact table by applying predicates local to the fact table, and applying each join predicate to each table in the second set by probing its corresponding join filter; and
for each large dimension table, creating a pre-join output filter from columns of the reduced fact table that join with each large dimension table; and
join all the dimension tables and the fact table in a star join while exploiting each pre-join output filter, including:
scanning each large dimension table of the first set, applying the created pre-join output filter as a local predicate during the scan and for each qualifying row of the dimension table creating an entry in a hash table;
scanning each dimension table in the second set, including applying predicates local to each remaining dimension table and for each qualifying row of each remaining dimension table creating an entry in an associated hash table; and
joining the fact table with all dimension tables, including scanning the fact table and probing each corresponding hash table for each reduced dimension table.

10. The computer program product of claim 9, further comprising program code to build a separate star join filter for each dimension table and probe the star join filter for each dimension when scanning the fact table, before probing the hash table for that dimension.

11. The computer program product of claim 9, further comprising program code to dynamically verify initiating the filter join during the building of one of the hash tables responsive to memory requirements exceeding system capacity.

12. The computer program product of claim 9, further comprising program code to eliminate tables in the second set as they are scanned if the local predicate is dynamically verified to be insufficiently selective.

13. The computer program product of claim 9, wherein the pre-join output filter eliminates values in the dimension table that are absent from the fact table.

14. The computer program product of claim 9, further comprising program code to create an entry an associated hash table while scanning each dimension table in the second set for each qualifying row of each dimension table in the second set, including eliminating scanning of the dimension table in the star join phase.

15. The computer program product of claim 14, further comprising prior to the star join, program code to create the pre-join output filter for each partition of the fact table and to broadcast the pre-join output filter to each large dimension table partition, and program code for each recipient node containing the partitions of the large dimension table to apply a logical OR combining each pre-join output filter.

16. The computer program product of claim 9, further comprising program code to partition the fact table and each large dimension table across two or more nodes of a shared-nothing cluster, and replicate all remaining dimension tables on each node in the cluster.

17. A system comprising:
- a processing unit in communication with data storage, the data storage having one or more tables of a database;
- a functional unit in communication with memory and the processing unit, the functional unit having tools to support query processing, the tools comprising:
  - an identification manager to identify a first set of at least one dimension table having a hash table size estimated to exceed a defined threshold, and to identify a second set of remaining tables having at least one local predicate;
  - a query manager in communication with the identification manager, the query manager to execute a query, the query execution including a first phase manager and a second phase manager:
    - the first phase manager to reduce each identified large dimension table in the first set, including:
      - build a join filter from each dimension table of the second set;
      - scan a fact table and reduce the fact table by applying predicates local to the fact table, and apply each join predicate to each table in the second set by probing its corresponding join filter; and
      - for each large dimension table, create a pre-join output filter from columns of the reduced fact table that join with each large dimension table;
    - the second phase manager to join all the dimension tables and the fact table in a star join while exploiting each pre-join output filter from the first phase, including:
      - scan each large dimension table of the first set, apply the created pre-join output filter as a local predicate during the scan and for each qualifying row of the dimension table create an entry in a hash table; and
      - scan each dimension table in the second set, including applying predicates local to each remaining dimension table and for each qualifying row of each remaining dimension table create an entry in an associated hash table; and
  - a join manager in communication with query manager, the join manager to join the fact table with all dimension tables, including scanning the fact table and probing each corresponding hash table for each reduced dimension table.

18. The system of claim 17, further comprising a star join manager in communication with the query manager, the star join manager to build a separate star join filter for each dimension table and to probe the star join filter for each dimension when scanning the fact table and before probing the hash table for that dimension.

19. The system of claim 17, further comprising the first phase manager to dynamically verify initiation of the filter join during the build of one of the hash tables responsive to memory requirements exceeding system capacity.

20. The system of claim 17, further comprising the first phase manager to eliminate tables in the second set as they are scanned if the local predicate is dynamically verified to be insufficiently selective.

21. The system of claim 17, further comprising the first phase manager to eliminate values in the dimension table that are absent from the fact table.

22. The system of claim 21, further comprising the first phase manager to create a pre-join output filter for each partition of the fact table and to broadcast the pre-join output filter to each large dimension table partition, and for each recipient node containing the partitions of the large dimension table to apply a logical OR combining each pre-join output filter.

23. The system of claim 17, further comprising a partition manager in communication with the query manager, the partition manager to partition the fact table and each large dimension table across two or more nodes of a shared-nothing cluster, and to replicate all remaining dimension tables on each node in the cluster.

* * * * *